United States Patent
Litkouhi et al.

(10) Patent No.: US 10,062,288 B2
(45) Date of Patent: Aug. 28, 2018

(54) SYSTEMS AND METHODS FOR AUTONOMOUS DRIVING MERGING MANAGEMENT

(71) Applicant: GM GLOBAL TECHNOLOGY OPERATIONS LLC, Detroit, MI (US)

(72) Inventors: Bakhtiar B. Litkouhi, Washington, MI (US); Chiyu Dong, Pittsburgh, PA (US); John M. Dolan, Pittsburgh, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 15/224,292

(22) Filed: Jul. 29, 2016

(65) Prior Publication Data

US 2018/0033308 A1  Feb. 1, 2018

(51) Int. Cl.
  *G08G 1/16*    (2006.01)
  *G05D 1/00*    (2006.01)
  *G05D 1/02*    (2006.01)

(52) U.S. Cl.
  CPC .......... *G08G 1/167* (2013.01); *G05D 1/0088* (2013.01); *G05D 1/0268* (2013.01)

(58) Field of Classification Search
  CPC ..... G08G 1/167; G05D 1/0268; G05D 1/0088
  See application file for complete search history.

(56) References Cited

U.S. PATENT DOCUMENTS

| | | | |
|---|---|---|---|
| 8,788,134 B1 | 7/2014 | Litkouhi et al. | |
| 8,810,431 B2 | 8/2014 | Mudalige et al. | |
| 2013/0054106 A1* | 2/2013 | Schmudderich .. | B60W 30/0956 701/96 |
| 2013/0099911 A1* | 4/2013 | Mudalige ............... | G08G 1/163 340/438 |
| 2014/0195093 A1* | 7/2014 | Litkouhi ............ | B62D 15/0255 701/23 |
| 2017/0031361 A1* | 2/2017 | Olson .................... | G08G 1/166 |

\* cited by examiner

*Primary Examiner* — Anne M Antonucci
(74) *Attorney, Agent, or Firm* — Lorenz & Kopf, LLP

(57) ABSTRACT

Systems and method are provided for controlling a first vehicle. In one embodiment, a method includes: determining, by a processor, that a second vehicle is going to merge into a current lane of the first vehicle at a merge point; and in response to the determining: obtaining, by the processor, a velocity history of the second vehicle, determining, by the processor, a first time value associated with the first vehicle and the merge point; determining, by the processor, a second time value associated with the second vehicle and the merge point; determining, by the processor, an intention of the second vehicle based on the velocity history, the first time value, and the second time value; and selectively generating, by the processor a command to at least one of control the first vehicle and provide notification based on the intention.

13 Claims, 4 Drawing Sheets

SYSTEMS AND METHODS FOR AUTONOMOUS DRIVING MERGING MANAGEMENT

TECHNICAL FIELD

The present disclosure generally relates to autonomous vehicles, and more particularly relates to systems and methods for managing merging maneuvers in an autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

The social behavior aspect of driving is a key attribute of everyday driving maneuvers. For example, people generally detect the subtle cues of other drivers' intentions before the intention is fully realized. The autonomous control of the vehicle can be improved by incorporating an evaluation of this social behavior aspect.

Accordingly, it is desirable to provide systems and methods that incorporate social behavior into autonomous driving. It is further desirable to provide methods and systems for managing merging maneuvers in an autonomous vehicle based on social aspects of driving. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a first vehicle. In one embodiment, a method includes: determining, by a processor, that a second vehicle is going to merge into a current lane of the first vehicle at a merge point; and in response to the determining: obtaining, by the processor, a velocity history of the second vehicle, determining, by the processor, a first time value associated with the first vehicle and the merge point; determining, by the processor, a second time value associated with the second vehicle and the merge point; determining, by the processor, an intention of the second vehicle based on the velocity history, the first time value, and the second time value; and selectively generating, by the processor a command to at least one of control the first vehicle and provide notification based on the intention.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the sensor platform system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
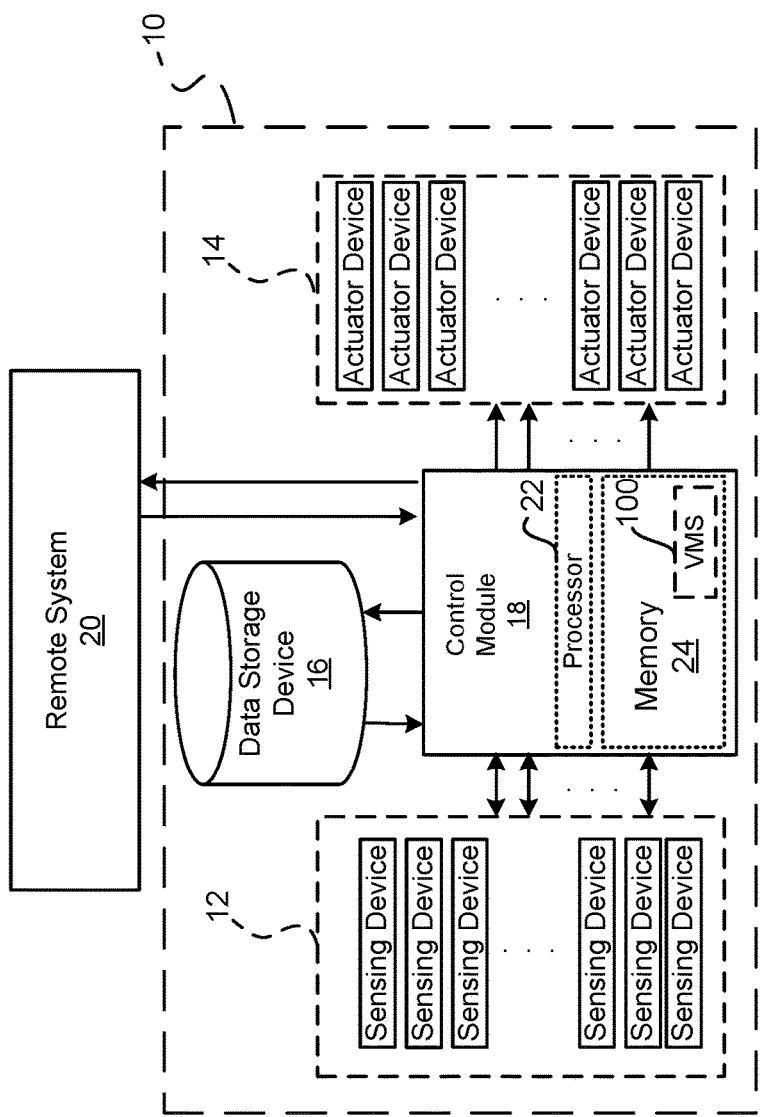
FIG. 1 is a functional block diagram illustrating an autonomous vehicle having a vehicle merging system, in accordance with various embodiments.

With reference to FIG. 1, a vehicle merge system (VSM) shown generally at 100 is associated with a vehicle 10 in accordance with various embodiments. In general, the vehicle merge system 100 determines that another vehicle (not shown) is going to merge into a current lane of the vehicle 10, determines an intention (I) of the other merging vehicle, and controls the vehicle 10 based on the intention (I) of the other merging vehicle.

In various embodiments, the vehicle 10 is an autonomous vehicle and the vehicle merge system 100 is incorporated into the autonomous vehicle 10 (hereinafter referred to as the host vehicle 10). The autonomous vehicle 10 is, for example, a driverless vehicle that is automatically controlled to carry passengers from one location to another. For example, components of the autonomous vehicle 10 may include: a sensor system 12, an actuator system 14, a data storage device 16, and at least one control module 18. The sensor system 12 includes one or more sensing devices 12a-12n that sense observable conditions of the exterior environment and/or the interior environment of the vehicle 10. The sensing devices 12a-12n can include, but are not limited to, radars, lidars, and cameras. The actuator system 14 includes one or more actuator devices 14a-14n that control one or more vehicle components (not shown). In various embodiments, the vehicle components are associated with vehicle operation and can include, but are not limited to, a throttle, brakes, and a steering system. In various embodiments, the vehicle components are associated with interior and/or exterior vehicle features and can include, but are not limited to, doors, a trunk, and cabin features such as air, music, lighting, etc.

The data storage device 16 stores data for use in automatically controlling the vehicle 10. In various embodiments, the data storage device 16 stores defined maps of the navigable environment. In various embodiments, the defined maps may be predefined by and obtained from a remote system 20. For example, the defined maps may be assembled by the remote system 20 and communicated to the vehicle 10 (wirelessly and/or in a wired manner) and stored by the control module 18 in the data storage device 16. As can be appreciated, the data storage device 16 may be part of the control module 18, separate from the control module 18, or part of the control module 18 and part of a separate system.

The control module 18 includes at least one processor 22 and memory 24. The processor 22 can be any custom made or commercially available processor, a central processing unit (CPU), an auxiliary processor among several processors associated with the control module 18, a semiconductor based microprocessor (in the form of a microchip or chip set), a macroprocessor, or generally any device for executing instructions. The memory 24 may be one or a combination of storage elements that store data and/or instructions that can be performed by the processor 22. The instructions may include one or more separate programs, each of which comprises an ordered listing of executable instructions for implementing logical functions.

The instructions, when executed by the processor 22, receive and process signals from the sensor system 12, perform logic, calculations, methods and/or algorithms for automatically controlling the components of the vehicle 10, and generate control signals to the actuator system 14 to automatically control the components of the vehicle 10 based on the logic, calculations, methods, and/or algorithms. Although only one control module 18 is shown in FIG. 1, embodiments of the vehicle 10 can include any number of control modules 18 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the control module 18 are embodied in the vehicle merge system 100 and, when executed by the processor 22, determine an intention of another vehicle and control operation of the vehicle 10 such that a maneuver can be autonomously performed by the vehicle 10 based on the determined intention. For example, the instructions process data from the sensor system 12 to detect a merging vehicle and to determine the intention of the merging vehicle. The intention (I) is generally determined based on determined probabilities (P) that the merging vehicle is yielding (Y) and not yielding (N). As will be discussed in more detail with regard to FIGS. 3 and 4, the probabilities are determined based on vehicle velocity data (V) and time to a merge point data (T) and using a Probabilistic Graph Model (PGM).

Figure 2:
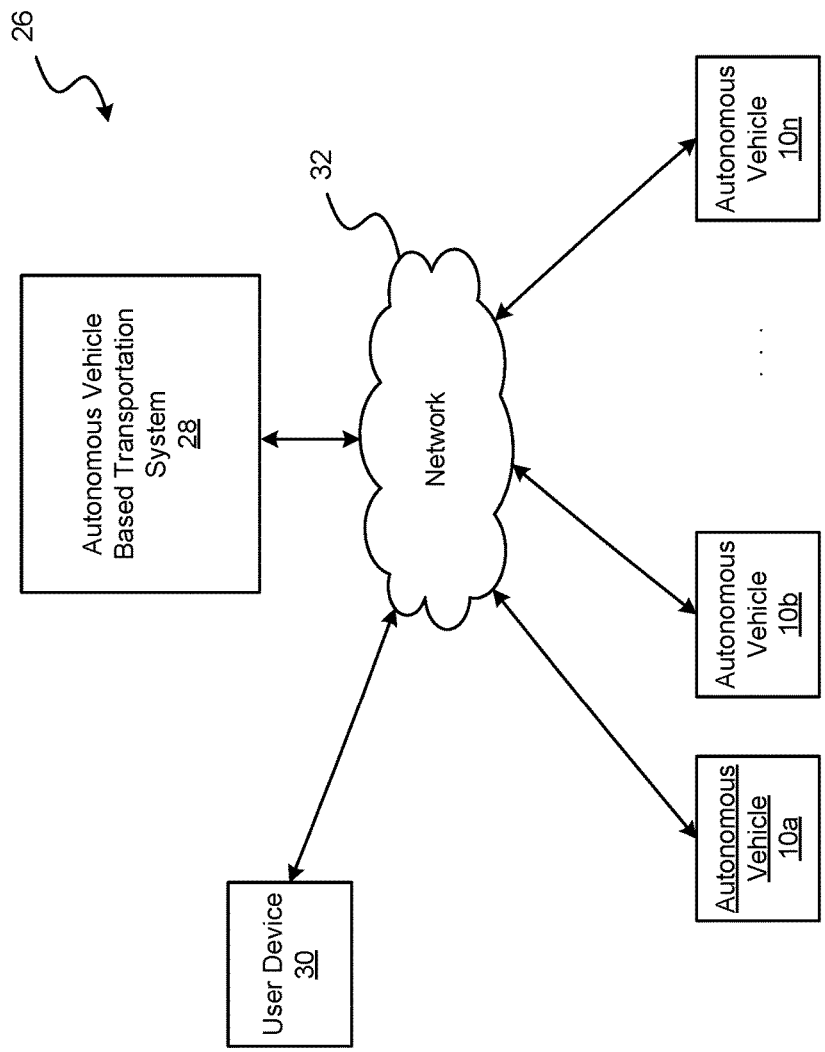
FIG. 2 is a functional block diagram illustrating a transportation system having one or more autonomous vehicles of FIG. 1, in accordance with various embodiments.

In various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like). For example, the autonomous vehicle 10 may be associated with an autonomous vehicle based transportation system. FIG. 2 illustrates an exemplary embodiment of an operating environment shown generally at 26 that includes an autonomous vehicle based transportation system 28 that is associated with one or more autonomous vehicles 10a-10n as described with regard to FIG. 1. In various embodiments, the operating environment 26 includes the transportation system 28, at least one user device 30, and a communication network 32.

The communication network 32 supports communication as needed between devices, systems, and components supported by the operating environment 26 (e.g., via tangible communication links and/or wireless communication links). Although only one user device 30 is shown in FIG. 2, embodiments of the operating environment 26 can support any number of user devices 30, including multiple user devices 30 owned, operated, or otherwise used by one person. Each user device 30 supported by the operating environment 26 may be implemented using any suitable hardware platform. In this regard, the user device 30 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 30 supported by the operating environment 26 is realized as a computer-implemented or computer-based device having the hardware, software, firmware, and/or processing logic needed to carry out the various techniques and methodologies described herein.

The autonomous vehicle based transportation system 28 includes one or more backend server systems, which may be cloud-based, network-based, or resident at the particular campus or geographical location serviced by the transportation system 28. The backend system can communicate with the user devices 30 and the autonomous vehicles 10a-10n to schedule rides, dispatch autonomous vehicles 10a-10n, and the like.

In accordance with a typical use case workflow, a registered user of the transportation system 28 can create a ride request via the user device 30. The ride request will typically indicate the passenger's desired pickup location (or current GPS location), the desired destination location (which may identify a predefined vehicle stop and/or a user-specified passenger destination), and a pickup time. The transportation system 28 receives the ride request, processes the request, and dispatches a selected one of the autonomous vehicles 10a-10n (when and if one is available) to pick up the passenger at the designated pickup location and at the appropriate time. The transportation system 28 can also generate and send a suitably configured confirmation message or notification to the user device 30, to let the passenger know that a vehicle is on the way.

As can be appreciated, the subject matter disclosed herein provides certain enhanced features and functionality to what may be considered as a standard or baseline autonomous vehicle and/or autonomous vehicle based transportation system 28. To this end, an autonomous vehicle and autonomous vehicle based transportation system can be modified, enhanced, or otherwise supplemented to provide the additional features described in more detail below.

Figure 3:
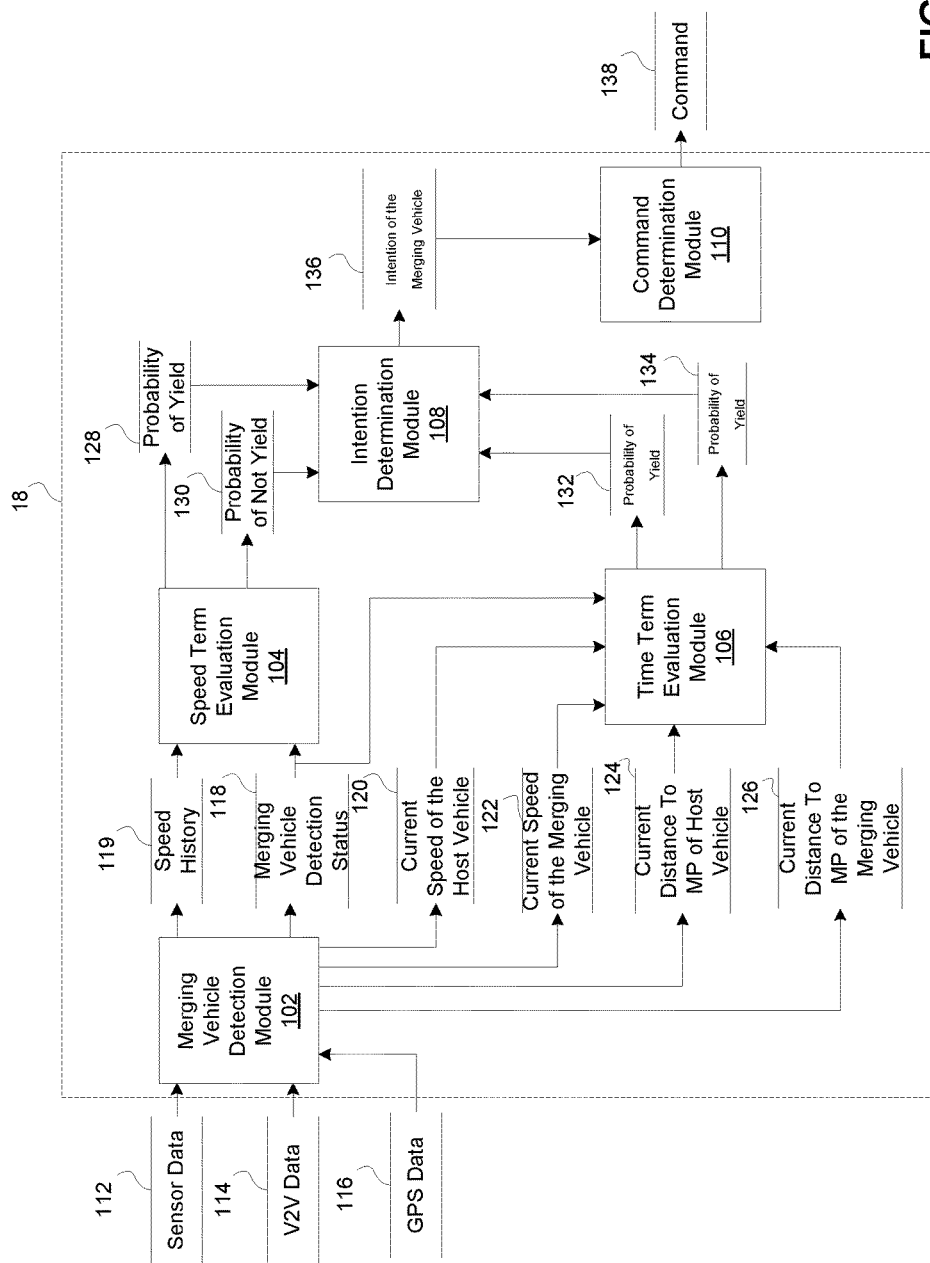
FIG. 3 is a dataflow diagram illustrating a vehicle merging system of the autonomous vehicle, in accordance with various embodiments.

Referring now to FIG. 3, and with continued reference to FIG. 1, a dataflow diagram illustrates various embodiments of the vehicle merge system 100 which may be embedded within the control module 18. Various embodiments of the vehicle merge system 100 according to the present disclosure can include any number of sub-modules embedded within the control module 18. As can be appreciated, the sub-modules shown in FIG. 3 can be combined and/or further partitioned to similarly determine an intent of another vehicle and to manage a merging procedure of the vehicle 10. Inputs to the vehicle merge system 100 may be received from the sensor system 12, received from other control modules (not shown) associated with the vehicle 10, and/or determined/modeled by other sub-modules (not shown) within the control module 18. In various embodiments, the control module 18 includes a merging vehicle detection module 102, a velocity term evaluation module 104, a time term evaluation module 106, an intention determination module 108, and a command determination module 110.

The merging vehicle detection module 102 receives as input sensor system data 112 from one or more of the lidar, radar, and/or camera, data from another vehicle (e.g., vehicle to vehicle communication data) 114, and/or data from a GPS or other location data 116. Based on the received data 112-116, the merging vehicle detection module 102 determines whether another vehicle or multiple vehicles at some point will be merging into a current lane of the host vehicle 10. For exemplary purposes, the disclosure will be discussed in the context of only one other vehicle (although the same will apply to multiple vehicles). The one other vehicle will hereinafter be referred to as the merging vehicle.

The merging vehicle detection module 102 sets a merging vehicle detected status 118 based on the detection of the merging vehicle. For example, if the location data 116 indicates that there is an entrance ramp to the road the host vehicle 10 is currently traveling, and the entrance ramp is located near the current location of the host vehicle 10 then the sensor system data 112 from the lidar, radar, and/or camera is evaluated to see if another vehicle is currently traveling on the entrance ramp and will be merging into the current lane. If another vehicle is detected, then it is determined that there is a merging vehicle. As can be appreciated, the above example is merely one example of many merging scenarios. The merging vehicle detection module 102 can detect a merging vehicle and set the merging vehicle detected status 118 based on any number of scenarios.

In various embodiments, if a merging vehicle is detected, the merging vehicle detection module 102 further processes the sensor system data 112 to obtain data about the merging vehicle and the host vehicle 10 in order to determine the intent of the merging vehicle. The obtained data includes a velocity history 119 of the merging vehicle, a current velocity 120 of the host vehicle 10, a current velocity 122 of the merging vehicle, a current distance 124 to a merge point of the host vehicle 10, and a current distance 126 to the merge point of the merging vehicle. In various embodiments, the merge point can be determined from the current position of the host vehicle 10 (e.g., provided by the location data 116), the determined position of the merging vehicle relative to the host vehicle's position (e.g., provided by the sensor data 112), and a defined map that provides merge points given the two positions. As can be appreciated, other methods of determining the merge point can be implemented in various embodiments. In various embodiments, the velocity history 119 can include a velocity and/or acceleration of the merging vehicle determined every x milliseconds over n cycles (e.g., 10 cycles or some other number).

The velocity term evaluation module 104 receives as input the merging vehicle detected status 118, and the velocity history 119 of the merging vehicle. When the merging vehicle detected status 118 indicates that a merging vehicle is detected, the velocity term evaluation module 104 computes a velocity based probability of yield 128 and a velocity based probability of not yield 130 based on the velocity history 119 of the merging vehicle. For example, considering that an instantaneous velocity and the intention are independent, the differences between velocitys in the velocity history are more important than the actual values. Thus, the velocity based probabilities can be simplified as follows:

$$P(V|I)=P(v_1|I)P(v_2-v_1|I) \ldots P(v_{n-1}-v_n|I); \text{ and}$$

$$\propto P(\Delta v_2|I) \ldots P(\Delta v_n|I).$$

Given a mixture of distributions, such as, but not limited to, Gaussian distributions, the velocity based probability for not yield (N) and yield (Y) can be computed as:

$$P(\Delta v_i|I=N) \sim N(a_a \Delta T, \sigma), \text{ and}$$

$$P(\Delta v_i|I=Y) \sim N(a_d \Delta T, \sigma),$$

where $a_a$, $a_d$ denote typical acceleration and deceleration respectively.

The time term evaluation module 106 receives as input the merging vehicle detected status 118, the current velocity of the host vehicle 120 ($V_h$), and the current velocity of the merging vehicle 122 ($V_m$), the distance to the merge point for the host vehicle 124 ($S_h$), and the distance to the merge point for the merging vehicle 126 ($S_m$). When the merging vehicle detected status 118 indicates that a merging vehicle is detected, the time term evaluation module 106 computes a time-to-arrival for the host vehicle and the merging vehicle given the distances and the vehicle velocitys, and computes a time based probability of yield 132 and a time based probability of not yield 134 based on the time-to-arrival. For example, the difference between the times is more important than the actual time values. Thus, the time based probability can be simplified as follows:

$$P(T_h, T_m|I)$$

A mixture of distributions, such as, but not limited to, Gaussians distributions are then used to compute $P(T_m - T_h|I) = P(\Delta T|I)$ For example, if the merging car decides to yield to the host car:

$$\mu_m^Y = \begin{cases} \dfrac{-v_{m,n} + \sqrt{v_{m,n}^2 + 2a_d S_m}}{2a_d} & \text{if } v_{m,n}^2 + 2a_d S_m > 0 \\ 2S_m/v_{m,n} & \text{otherwise} \end{cases},$$

$$\mu_h^Y = \dfrac{-v_{h,n} + \sqrt{v_{h,n}^2 + 2a_a S_h}}{2a_a},$$

Then $\mu^Y = \mu_m^Y - \mu_h^Y$, and
$P(\Delta T|I=Y) \sim N(\mu^Y, \sigma)$, where $v_{m,n}$, $v_{h,n}$ denote velocitys at the nth step or the current velocitys, respectively, for the merging and host vehicles. $S_m$, $S_n$ denote the distance to the merging point, respectively, from the merging and host vehicles.

In another example, if the merging car decides not to yield to the host car:

$$\mu_m^N = \frac{-v_{m,n} + \sqrt{v_{m,n}^2 + 2a_a S_m}}{2a_a},$$

$$\mu_h^N = \begin{cases} \frac{-v_{h,n} + \sqrt{v_{h,n}^2 + 2a_d S_h}}{2a_d} & \text{if } v_{h,n}^2 + 2a_d S_h > 0 \\ 2S_h/v_{h,n} & \text{otherwise} \end{cases},$$

then $\mu^N = \mu_m^N - \mu_h^N$, and
$P(\Delta T|I=N) \sim N(\mu^N, \sigma)$.

The intention determination module 108 receives as input the velocity based probability for yield 128, the velocity based probability for not yield 130, the time based probability for yield 132, and the time based probability for not yield 134. Based on the received data 128-134, the intention determination module 108 computes a combined probability and evaluates the combined probability to determine an intention of the merging vehicle 136.

For example, the combined probabilities for yield and not yield are computed as follows:

$P(V, T_h, T_m|I=Y) = P(V|I=Y)P(T_h, T_m|I=Y)$ and $P(V, T_h, T_m|I=N) = P(V|I=N)P(T_h, T_m|I=N).$ The combined probabilities are then evaluated as follows:

If $P(V, T_h, T_m|I=Y) > P(V, T_h, T_m|I=N)$ then,

The intention of the merging vehicle 136 is set to Yield
Else,
The intention of the merging vehicle 36 is set to Not Yield.

The command determination module 110 receives as input the intention of the merging vehicle 136. The command determination module 110 then determines an acceleration or a deceleration command 138 based on the intention of the merging vehicle 136. For example, if the intention 136 is Yield then an acceleration command 138 is determined and commanded to the host vehicle 10. In another example, if the intention 136 is Not Yield then a deceleration command 138 is determined and commanded to the host vehicle 10. In various embodiments, the command includes advisory information that may be communicated to an occupant of the vehicle or other system of the vehicle.

In various embodiments, the command includes an actual acceleration or deceleration rate that is used to control the host vehicle 10. The actual acceleration or deceleration rate is computed from a linear quadratic regulator (LQR) control model. The LQR control model ensures the acceleration rate satisfies efficiency and comfort, according to the host vehicle's current velocity, velocity limits, and distance to any leading vehicle (if one exists). For example, once the merging vehicle yields to the host vehicle, and an acceleration command is determined, then the LQR control model performs a velocity profile to reach the velocity limit. In another example, once the merging vehicle does not yield to the host vehicle, and a deceleration command is determined, the LQR control model performs a distance keeping method to generate proper acceleration/deceleration for following behind the merging vehicle.

Figure 4:
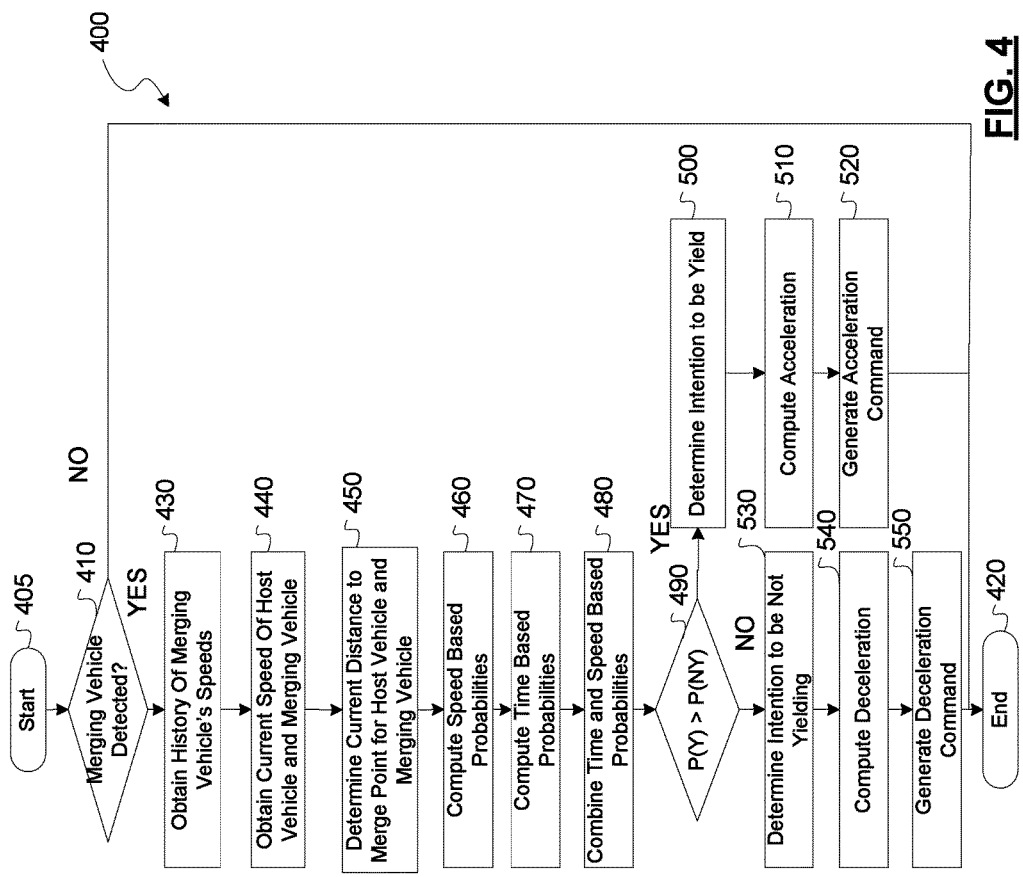
FIG. 4 is a flowchart illustrating a control method for controlling the autonomous vehicle, in accordance with various embodiments.

Referring now to FIG. 4, and with continued reference to FIGS. 1-3, a flowchart illustrates a control method 400 that can be performed by the control module 18 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

In various embodiments, the method may begin at 405. It is determined whether a merging vehicle is detected at 410. If a merging vehicle is not detected at 410, the method may end at 420. If, however, a merging vehicle is detected at 410, the data is obtained for evaluation at 430-450. For example, the velocity history 119 is determined over n cycles at 430. The current velocity of the merging vehicle 122 and the current velocity of the host vehicle 120 are determined at 440. The current distance to the merge point for the host vehicle 124 and the current distance to the merge point for the merging vehicle 126 are determined at 450.

Thereafter, based on the velocity history 119, the distances to the merge point 124, 126, and the current vehicle velocitys 120, 122, the probabilities 128-134 are determined at 460-480. For example, the velocity based probabilities 128, 130 are determined as discussed above at 460; and the time based probabilities 132, 134 are determined as discussed above at 470. Thereafter, the combined probabilities are determined based on the velocity based probabilities 128, 130 and the time based probabilities 132, 134 as discussed above at 480.

The combined probabilities are then evaluated at 490. For example, if the combined probability of yield is greater than the combined probability of not yielding, then it is determined that the intention of the merging vehicle 136 is Yield at 500. The acceleration command for the host vehicle 10 is determined at 510 and the command 138 is generated to achieve the determined acceleration rate and/or provide notification at 520. Thereafter, the method may end at 420.

If, however, the combined probability of yield is less than or equal to the combined probability of not yielding, then it is determined that the intention of the merging vehicle 136 is Not Yielding at 530. The deceleration command for the host vehicle 10 is determined at 540; and the command 138 is generated to achieve the determined deceleration rate and/or provide notification at 550. Thereafter, the method may end at 420.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A method of controlling a first vehicle, comprising:
    determining, by a processor, that a second vehicle is going to merge into a current lane of the first vehicle at a merge point; and
    in response to the determining:

obtaining, by the processor, a velocity history of the second vehicle, determining, by the processor, a first time value associated with the first vehicle and the merge point;

determining, by the processor, a second time value associated with the second vehicle and the merge point;

determining, by the processor, one of a yield intention and a non-yield intention of the second merging vehicle based on a first summation of a velocity based probability of yield value computed from the velocity history with a time based probability of yield value computed from the first time value and the second time value, and a summation of a velocity based probability of non-yield value computed from the velocity history with a time based probability of non-yield value computed from the first time value and the second time value; and selectively generating, by the processor a command to at least one of control the first vehicle and provide notification based on the intention.

2. The method of claim 1, wherein the determining the intention is further based on at least one probabilistic graph model.

3. The method of claim 1, wherein the determining the intention is based on changes in velocity determined form the velocity history.

4. The method of claim 1, wherein the determining the intention is based on a difference between the first time value and the second time value.

5. The method of claim 1 further comprising determining a probability based on the velocity history and a distribution, and wherein the determining the intention is based on the probability.

6. The method of claim 1 further comprising determining a probability based on the first time value, the second time value, and a distribution, and wherein the determining the intention is based on the probability.

7. The method of claim 1 further comprising: obtaining a current velocity of the first vehicle; obtaining a current distance to the merge point of the first vehicle, and wherein the determining the first time value is based on the current velocity of the first vehicle, and the current distance to the merge point of the first vehicle.

8. The method of claim 7 further comprising:
obtaining a current velocity of the second vehicle;
obtaining a current distance to the merge point of the second vehicle, and
wherein the determining the second time value is based on the current velocity of the second vehicle, and the current distance to the merge point of the second vehicle.

9. A system for controlling a first vehicle, comprising:
a non-transitory computer readable medium comprising:

a first module that, by a processor, determines that a second vehicle is going to merge into a current lane of the first vehicle, and that determines a merge point;

a second module that, by a processor, in response to the determination: obtains a velocity history of the second vehicle, determines a first time value associated with the first vehicle and the merge point, and determines a second time value associated with the second vehicle and the merge point;

a third module that, by a processer, determines one of a yield intention and a non-yield intention of the second merging vehicle based on a first summation of a velocity based probability of yield value computed from the velocity history with a time based probability of yield value computed from the first time value and the second time value, and a summation of a velocity based probability of non-yield value computed from the velocity history with a time based probability of non-yield value computed from the first time value and the second time value; and a fourth module that, by a processor, selectively generates a command to at least one of control the first vehicle and provide notification based on the intention.

10. The system of claim 9, wherein the third module determines the intention further based on at least one probabilistic graph model.

11. The system of claim 9, wherein the third module determines the intention based on changes in velocity determined form the velocity history.

12. The system of claim 9, wherein the third module determines the intention based on a difference between the first time value and the second time value.

13. An autonomous vehicle, comprising:
at least one sensor that provides sensor data; and
a control module that, by a processor and based on the sensor data, determines that a second vehicle is going to merge into a current lane of the first vehicle at a merge point, and in response to the determination: obtains a velocity history of the second vehicle, determines a first time value associated with the first vehicle and the merge point, determines a second time value associated with the second vehicle and the merge point, determines one of a yield intention and a non-yield intention of the second merging vehicle based on a first summation of a velocity based probability of yield value computed from the velocity history with a time based probability of yield value computed from the first time value and the second time value, and a summation of a velocity based probability of non- yield value computed from the velocity history with a time based probability of non-yield value computed from the first time value and the second time value, and selectively generates a command to at least one of control the first vehicle and provide notification based on the intention.

* * * * *